United States Patent [19]

Thigpen et al.

[11] Patent Number: 4,637,000

[45] Date of Patent: Jan. 13, 1987

[54] DEPTH TRANSDUCER PROTECTIVE ASSEMBLY

[75] Inventors: Ben B. Thigpen; E. Eugene Crump, both of Houston; Otis A. Johnston, League City, all of Tex.; Nathaniel K. McPeek, Anchorage, Ak.; William O. McNeel, Houston, Tex.

[73] Assignee: Western Geophysical Co. of America, Houston, Tex.

[21] Appl. No.: 747,270

[22] Filed: Jun. 21, 1985

[51] Int. Cl.⁴ .................. H04R 1/02; H04R 17/00; G01L 7/00

[52] U.S. Cl. .................. 367/172; 367/167; 367/165; 73/707

[58] Field of Search .............. 367/144, 146, 167, 172, 367/165; 181/118, 120; 73/707; 29/602 A

[56] References Cited

U.S. PATENT DOCUMENTS

| | | |
|---|---|---|
| 2,210,480 | 8/1940 | Brice .................. 73/707 |
| 2,347,903 | 5/1944 | Gluck et al. .................. 73/707 |
| 3,477,464 | 11/1969 | Ryan .................. 73/707 |
| 3,846,744 | 11/1974 | Renna, Jr. et al. .................. 367/165 |
| 4,364,117 | 12/1982 | Snow .................. 367/167 |
| 4,545,041 | 10/1985 | Tims et al. .................. 367/165 |

FOREIGN PATENT DOCUMENTS

| | | | |
|---|---|---|---|
| 554522 | 7/1943 | United Kingdom .................. 73/707 |
| 303545 | 12/1971 | U.S.S.R. .................. 73/707 |
| 518662 | 7/1976 | U.S.S.R. .................. 73/707 |

Primary Examiner—Deborah L. Kyle
Assistant Examiner—Ted L. Parr
Attorney, Agent, or Firm—Robert E. Lowe; Barry C. Kane

[57] ABSTRACT

A ruggedized depth transducer for measuring ambient hydrostatic pressure adjacent an acoustic source wherein the transducer includes a housing having a depth sensor mounted therein. The housing further includes a bore for placing the depth sensor in fluid communication with the ambient pressure. Mounted within the housing bore are a series of mechanical filters for attenuating high-intensity pressure spikes generated by the acoustic source from damaging the depth sensor contained within the housing. The mechanical filters allow gradual changes in ambient pressure to pass into the bore and influence the depth sensor.

7 Claims, 3 Drawing Figures

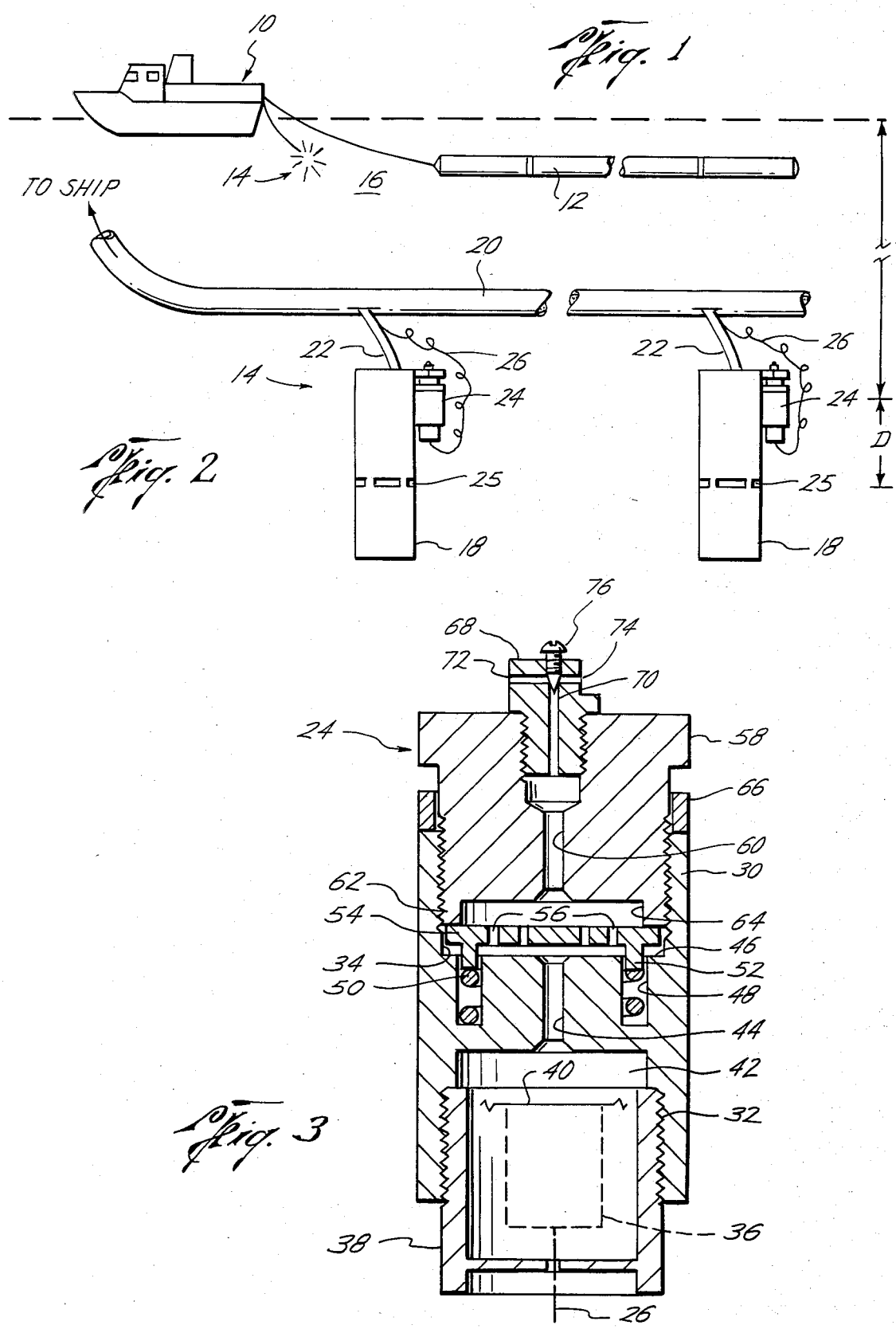

DEPTH TRANSDUCER PROTECTIVE ASSEMBLY

FIELD OF THE INVENTION

This invention relates to depth transducers and particularly to transducers subject to high-intensity transient pressure spikes.

BACKGROUND OF THE INVENTION

In marine seismic exploration, an acoustic source disposed beneath the water surface generates a signal which is reflected from layers beneath the ocean floor and received by hydrophones connected to a remote recording unit. The received reflected signal provides information about the subsurface characteristics of the earth.

Conventional acoustic sources used in marine exploration consist of an array of many air guns or water guns fired simultaneously at preselected time intervals. The shape of the acoustic wave or "signature" of the array is dependent upon the depth at which the array is fired and on the synchronization of the firing instant among all the guns in the array. If one of the two parameters or both are not substantially the samefor all guns the seismic signature will be less than optimum. If the depths of the guns are different, the firing instant of each gun can be changed (by fractions of a millisecond) so that the resulting acoustic wavefront is at maximum amplitude and strength.

Heretofore, the depth of each gun was controlled by the towing speed, weight of the gun, and by surface buoys. With the advent of more sophisticated recording equipment providing better signal resolution, the quality of the acoustic signal needed to be refined. The exact depth of each gun in the array, and the exact firing instant of each gun needed to be determined.

First attempts at making the guns "fly" at the same depth were made by using various types of hydrofoils and "birds" similar to those used on marine streamer cables. However, the weight and shape of the guns did not lend themselves to that type of arrangement.

An early attempt to determine gun depth was made by placing the depth transducer aboard ship. The transducer detected hydrostatic pressure through a long open-ended tube having the open end adjacent the acoustic source. A regulated air flow through the tube kept the tube purged. A change in the flow rate through the tube was related to a change in hydrostatic head. The use of larger pneumatic acoustic sources required a greater air flow through the tube to keep it purged. The air flow increase reduced the sensitivity of the sensing system.

Later attempts were made to determine gun depth by placing depth transducers on each gun. The firing instant of each gun would be varied according to its depth. This arrangement worked for a short period of time until the shock wave generated by the sources disabled the sensors.

It is an object of this invention to provide a ruggedized depth sensor for mounting directly on a seismic source.

SUMMARY OF THE INVENTION

In accordance with the teachings of the present invention, the sensor assembly includes a housing adapted for receiving a depth sensor in one end. The housing includes a bifurcated passage for placing the depth sensor in fluid communication with ambient pressure. The two legs of the bifurcated passage are of different lengths so that the pressure spike propagating through each will be attenuated by interference before reaching the sensor. The passage includes one or more restrictions therein to prevent a substantially instantaneous pressure spike from affecting the depth sensor. A biased valve mechanism sensitive to pressure spikes is disposed within the passage between the sensor and the housing exterior. The passage and valve are adapted to pass low frequency pressure pulses and to attenuate pressure spikes. A compliant member of predetermined volume is disposed between the depth sensor and the biased valve mechanism to absorb an impulsive pressure spike and to isolate the depth sensor from the surrounding water.

It is still a further aspect of this invention to mechanically filter transient pressure spikes from the ambient pressure detected by a depth transducer.

BRIEF DESCRIPTION OF THE DRAWINGS

A better understanding of the benefits and advantages of my invention may be obtained from the appended detailed description and the drawings, wherein:

FIG. 1 is an elevational view of a ship towing a streamer cable and a seismic source through a body of water;

FIG. 2 is a diagrammatic view of the sensor assembly mounted to a seismic source; and FIG. 3 is an elevational view of the present invention.

DETAILED DESCRIPTION OF THE PREFERRED EMBODIMENT

FIG. 1 is a general elevational view of a ship 10 towing a streamer cable 12 and an acoustic source 14 through a body of water 16. The streamer cable 12 contains compasses, depth transducers, and hundreds of hydrophones for receiving and transmitting data to a remote recording device aboard the ship 10.

FIG. 2 is an enlarged elevational view of the acoustic source 14. Source 14 conventionally includes a plurality of generators 18 such as air guns or water guns well known in the industry. Each generator 18 is connected to a hose bundle 20 by a supply hose 22 which provides compressed gas to actuate the generator 18. Connected to generator 18 is a ruggedized depth sensor assembly 24 of this invention. Assembly 24 may equally be connected to supply hose 22, or disposed within an upper housing of generator 18. It is preferred to connect the assembly 24 to the generator 18 at a predetermined distance D above and away from the exhaust ports 25. Assembly 24 is connected via wire conductor 26 to a display and recording device aboard the ship 10.

FIG. 3 is an elevational view in cross-section of the ruggedized sensor assembly 24 including a cylindrical housing 30 with concentric radial bores 32 and 34 in opposite ends. Radial bore 32 is adapted to receive a depth transducer 36 of any conventional type such as a variable-reluctance or moving-coil transducer well known in the art. Depth transducer 36 is encased in a waterproof housing 38 having a watertight compliant diaphragm 40 separating the transducer 36 from a surge chamber 42 defined between the transducer 36 and housing 30. Surge chamber 42 is in fluid communication with radial bore 34 by an axial passage 44 in housing 30.

Contained in face 46 in the bottom of radial bore 34, and concentric with axial passage 44, is a cylindrical groove 48 for receiving a spring 50 therein. Partially received by groove 48, and engaging spring 50, are valve guides 52 of a disc-shaped check valve 54. Valve 54 is oriented perpendicular to the longitudinal axis of housing 30 and loosely sits in the bottom of bore 34. Valve 54 has a plurality of off-axial holes 56 passing through the body of the disc.

A plug 58, having an axial hole 60 extending therethrough, is received by radial bore 34. A cylindrical flange 62 urges valve guides 52 of valve 54 to engage spring 50 within groove 48. A valve chamber 64 is defined by face 46, the end of plug 58 and flange 62. Plug 58 is maintained in fixed relation to housing 30 by a jam nut 66 threadably engaging plug 58.

Disposed within the exterior end of axial hole 60 in plug 58 is an intake plug 68 having a longitudinal conduit 70 bifurcating into inlet conduits 72 and 74 therein. Conduits 70, 72 and 74 are of preselected diameter less than that of axial hole 60 or axial passage 44. The axes of bifurcated conduits 72 and 74 are oriented normal to the axis of longitudinal conduit 70. The lengths of conduits 72 and 74 are unequal with conduit 72 being the longer of the two. At the junction of conduits 70, 72 and 74 is a metering valve 76 threadably received by intake plug 68. Metering valve 76 may be adjusted to increase or reduce flow through inlet conduits 72 and 74.

The components comprising the sensor assembly 24 may be manufactured from stainless steel, polycarbonate plastic, or other corrosion resistant material.

In operation, a ruggedized sensor assembly 24 is mounted to each acoustic source 14 and payed out into the water 16. The depth of each source 14 is measured by the depth transducer 36 within each assembly 24. The ambient hydrostatic pressure enters the cavity within the housing defined by the series of passages in communication with the depth transducer 36. When the generator 18 is actuated, a pressure spike on the order of 10-20 bar-meters is present in the fluid immediately surrounding the source and enters the inlet passages 72 and 74. Because of the orientation of the intake passages 72 and 74, the pressure pulse is attenuated greatly. The pressure pulse propagating through the shorter inlet 74 reaches the junction of longitudinal conduit 70 first. The pressure pulse encounters resistance in turning the right angle into conduit 70. Because of the resistance, the pressure pulse propagates into the less resistant inlet 72 where it collides with the pressure pulse counterpropagating therein. The energy of the pressure plate is substantially attenuated by the collision. The weakened pressure pulse passes down conduit 70 and hole 60 before entering the valve chamber 64. The pressure pulse is further attenuated by entering valve chamber 64 where the larger volume dissipates most of the energy of the pulse. If the force of the pressure pulse against valve 54 in chamber 64 is less than the force of the spring 50, the pressure pulse will pass valve 54 through holes 56, into passage 44, and into surge chamber 42. The circuitous route the pulse follows from valve chamber 64 to sensor chamber 42 further reduces the force of the pulse. Once the pulse reaches chamber 42, it is further dissipated and it possesses insufficient energy to damage the diaphragm 40 or the depth transducer 36.

Alternatively, if the pressure pulse entering chamber 64 from passage 60 exerts a force upon valve 54 greater than the force exerted by the spring 60, the valve 54 will depress spring 50 and be compressed against face 46 denying access of the pressure pulse to the depth transducer 36. Once the pressure against valve 54 within chamber 64 has decreased below that of the spring 50, valve 54 reopens. Depth transducer 36 is undamaged from the pressure spike and continues to detect ambient pressure.

In an alternate embodiment of this invention, the inlet conduits 72 and 74 are of equal length, but of different diameters. The different diameters result in different arrival times of the pressure spike at the conduit junction.

For illustrative purposes, my invention has been described with a certain degree of specificity. Variations will occur to those skilled in the art but which may be included within the scope and spirit of this invention which is limited only by the appended claims.

I claim as my invention:

1. A ruggedized depth transducer for measuring ambient pressure at an acoustic source, comprising:
   (a) a housing having a longitudinal bore extending therethrough;
   (b) sensing means disposed within said bore and in fluid communication with said ambient pressure through said bore;
   (c) means within said bore for attenuating a spike in said ambient pressure propagating within said bore, said attenuating means having;
      (1) intake means with a first and a second inlet conduit of unequal length intersecting said bore for interferring said ambient pressure spike with itself;
      (2) metering means engaging the intersection of said first and second inlet conduit and said bore for adjusting a flow therethrough;
      (3) means disposed in series within said bore for reducing an amplitude of said spike;
      (4) valve means for closing said bore in response to a predetermined pressure exerted by said spike; and
      (5) compliant means between said sensing means and said bore for absorbing said spike in ambient pressure.

2. A ruggedized depth transducer as defined in claim 1, wherein said amplitude-reducing means comprises:
   (a) a valve chamber disposed within said bore; and
   (b) a surge chamber disposed between said compliant means and said bore.

3. A ruggedized depth transducer as defined in claim 2, wherein said valve means comprises:
   (a) a check valve having a plurality of holes extending therethrough, said valve disposed within said valve chamber perpendicular to the axis of said bore; and
   (b) biasing means disposed between said check valve and said housing for urging said valve in an open position; and
   (c) means for retaining said valve within said valve chamber.

4. A ruggedized depth transducer that operates by detecting relatively long-term variations in ambient pressure in the presence of large-amplitude, short-term pressure impulses comprising:
   (a) a ruggedized container,
   (b) a first plurality of passes, having differing pressure conducting characteristics, from the exterior to a chamber in the interior of said container,
   (c) a pressure transducer in fluid communication with said chamber, and
   (d) a check valve between said chamber and said transducer.

5. Within a pressure-sensitive depth transducer for detecting depth in the presence of large-amplitude pressure impulses, the improvement comprising:
   (a) an interferometric pressure attenuator in series with,
   (b) a pressure-reducing chamber, and
   (c) a check valve, all interposed between the exterior ambient pressure and an internally mounted pressure transducer.

6. A depth transducer having a housing with a longitudinal bore extending therethrough, for measuring ambient pressure subject to intermittent spikes, comprising:
   (a) sensing means coupled to said housing and in fluid communication with said ambient pressure through said bore;
   (b) means within said bore for interfering a spike in ambient pressure with itself;
   (c) means within said interfering means for metering a flow therethrough;
   (d) means within said bore for dissipating said spike in ambient pressure;
   (e) means within said bore for closing off said sensing means from said ambient pressure in response to a predetermined pressure exerted by said spike; and
   (f) compliant means between said sensing means and said bore for absorbing said spike in ambient pressure.

7. A ruggedized depth transducer as defined in claim 6, wherein said interfering means, comprises:
   (a) a plug having a bifurcated inlet, the bifurcations of said inlet being of unequal diameters; and
   (b) metering means disposed at the junction of said bifurcated inlet for adjustably restricting flow therethrough.

* * * * *